United States Patent [19]
Shoji

[11] Patent Number: 5,949,767
[45] Date of Patent: *Sep. 7, 1999

[54] RECEPTION UNIT FOR RECEIVING A FREQUENCY DIVISION MULTI-ACCESSED SIGNAL BASED ON PLURAL SPREAD SIGNALS AND METHOD FOR RECEIVING THE SAME

[75] Inventor: Takashi Shoji, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/630,435

[22] Filed: Apr. 10, 1996

[30] Foreign Application Priority Data

Apr. 11, 1995 [JP] Japan ..................................... 7-110042

[51] Int. Cl.$^6$ .................................................. H04B 7/208
[52] U.S. Cl. .......................... 370/320; 370/344; 370/484; 375/200
[58] Field of Search ..................................... 370/203, 320, 370/321, 319, 342, 344, 335, 307, 480, 481, 482, 484–488; 375/200, 201, 204; 455/324

[56] References Cited

U.S. PATENT DOCUMENTS

| | | | |
|---|---|---|---|
| 5,136,612 | 8/1992 | Bi ............................................. | 370/342 |
| 5,278,837 | 1/1994 | Kelley ...................................... | 370/343 |
| 5,323,391 | 6/1994 | Harrison .................................. | 370/484 |
| 5,396,489 | 3/1995 | Harrison .................................. | 370/307 |
| 5,490,173 | 2/1996 | Whikehart et al. ..................... | 370/484 |
| 5,715,235 | 2/1998 | Sawahashi et al. ..................... | 370/480 |

FOREIGN PATENT DOCUMENTS

| | | |
|---|---|---|
| 63-54033 | 3/1988 | Japan . |
| 63-36696 | 7/1988 | Japan . |
| 64-32735 | 2/1989 | Japan . |
| 3-92029 | 4/1991 | Japan . |
| 3-174831 | 7/1991 | Japan . |
| 4-91528 | 3/1992 | Japan . |

*Primary Examiner*—Chau Nguyen
*Attorney, Agent, or Firm*—Ostrolenk, Faber, Gerb & Soffen, LLP

[57] ABSTRACT

A reception unit for receiving a frequency division multi-accessed signal based on not more than n (n is an integer) spread signals derived from spreading a carrier includes a conversion device for converting a received signal into a quantizable intermediate frequency band signal. Also included is a device for converting the intermediate frequency band signal into a digital signal and outputting a digital intermediate frequency band signal, n units of frequency converters respectively corresponded with n spread signals one by one for frequency converting the digital intermediate frequency band signal so that a center frequency of a corresponding spread signal among the n spread signals becomes 0 Hz, and n units of FIR filters respectively corresponding with the n spread signals one by one for passing only a corresponding spread signal among the frequency converted digital intermediate frequency band signals. A selector is provided for selecting and outputting signals outputted from the n units of FIR filters, a controller is provided for controlling frequency conversion conducted by the n units of frequency converters and filtering conducted by the n units of FIR filters, and a device is provided for inverse-spreading an output signal of the selector.

19 Claims, 5 Drawing Sheets

FIG.2
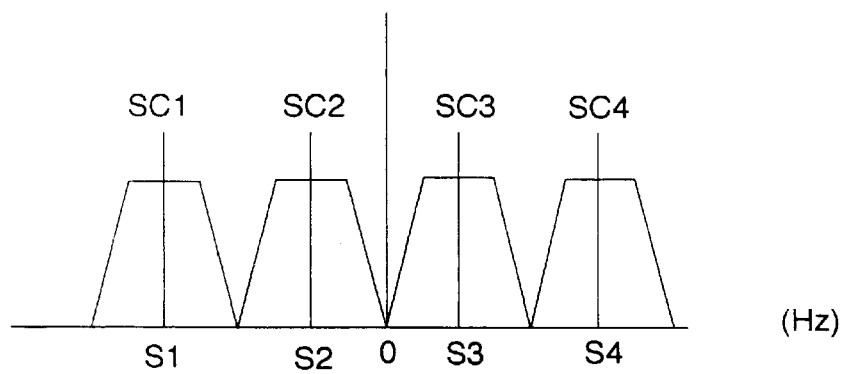
Fig.2A
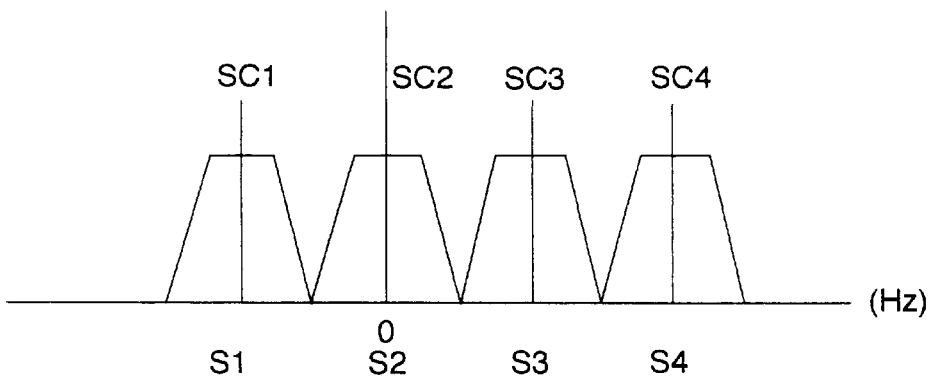
Fig.2B
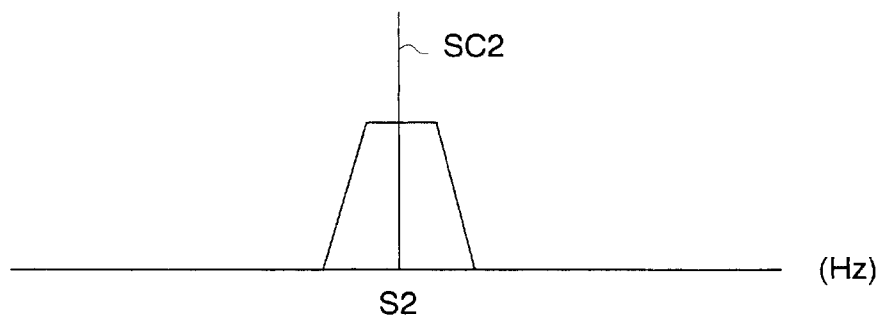
Fig.2C

RECEPTION UNIT FOR RECEIVING A FREQUENCY DIVISION MULTI-ACCESSED SIGNAL BASED ON PLURAL SPREAD SIGNALS AND METHOD FOR RECEIVING THE SAME

BACKGROUND OF THE INVENTION

This invention relates to a frequency division multi-access communication system for transmitting a carrier modulated with an information signal and, more particularly, to a radio reception unit employing a spread spectrum modulation system.

Two methods have been generally used for a communication system for transmitting information through spread spectrum modulation with bandwidth wider than that of the transmission information. One is a frequency hopping method for changing the carrier responding to changes in plural frequencies upon transmission. The other is a direct spread method for modulating the carrier by using a spread code with its bandwidth wider than that of the information signal. A Japanese Patent Application Laid-Open No. 36696 (1988) titled "Reception Unit" discloses a radio reception unit employing the aforementioned communication system.

FIG. 4 is a block diagram of a representative construction of a conventional radio reception unit.

Referring to FIG. 4, the radio reception unit comprises 25 an antenna 1 for receiving a transmission wave, a broad-band band pass filter (BPF) 2 through which the received signal from the antenna 1 passes, a high frequency by-pass selector 3 for selecting an output or non-output by switching ON (energize) or OFF (deenergize) the received signal from the antenna 1 and a narrow-band band pass filter (BPF) 4 (4a, 4b, . . . , 4n) each of which is set to have a different center frequency.

The reception unit further comprises a narrow-band BPF selector 5 (5a, 5b) for selecting one of the narrow-band BPF 4 (4a, . . . , 4n) through switching input/output terminals thereof, a control section 6 for controlling the selection of the high-frequency by-pass selector 3 and the narrow-band BPF selector 5 based on a received signal sent from the broad-band BPF 2, a demodulation section 7 for demodulating the received signal sent from either the broad-band BPF 2 or the narrow-band BPF 4 and an output terminal (loud speaker) 8 for outputting a demodulated signal sent from the demodulation section 7.

An operation of this prior art is described.

A received signal from the antenna 1 is input to moving contacts of the high frequency by-pass selector 3 and the narrow-band BPF selector 5. The high frequency by-pass selector 3 is set to ON (energized) through the control section 6 at an initial reception stage when it is not synchronized. The received signal from the high frequency by-pass selector 3 is input to the control section 6 and the demodulation section 7 through the broad-band BPF 2.

Being synchronized through the control section 6, the high frequency by-pass selector 3 is set to OFF (deenergized). The narrow-band BPF 5 concurrently selects one narrow-band BPF 4 so as to match with the received frequency through the control section 6. The demodulation section 7 receives one output of either the broad-band BPF 2 or the narrow-band BPF 4 and sends the demodulated output to the output terminal (loud speaker) 8.

In the conventional radio reception unit, the BPF with its bandwidth matching the received frequency is selected among those with different bandwidth for transmitting information with plural frequency bands.

The reception units of the similar type have been proposed in Publications of Japanese Patent Application Laid-Open Nos. 36696 (1988) titled "Reception Unit"; 54033 (1988) titled "Spread Spectrum Modulation/Demodulation Unit"; 32735 (1989) titled "Code Division Multi-Access Communication Unit"; 92029 (1991) titled "Spread Spectrum Reception Unit"; 174831 (1991) titled "Spread Spectrum Reception Unit"; and 91528 (1992) titled "Spread Spectrum Reception Unit".

In the above reception unit, a suitable BPF is selected among those with different bandwidth and the interfering wave is removed for quality reception. Therefore it is difficult for such a reception unit to reduce the circuitry size as well as circuit integration. Furthermore the reception characteristic is likely to vary with the received carrier frequency.

FIG. 5(a), (b) and (c) are graphical views showing high-speed and low-speed transmissions of video data with the spread spectrum communication system.

Recently the spread spectrum communication system employing the direct spread method has been increasingly used. In the video data transmission as shown in FIG. 5(a), an audio signal of low-speed data is transmitted. In the video data transmission as shown in FIG. 5(b), a video signal of high-speed data is transmitted. In case an audio signal of low-speed data has a small amount of transmission information, the spread bandwidth is decreased and plural carriers are frequency division multi-accessed. The assigned frequency band is divided into plural frequency bands (SC1, SC2, SC3 and SC4) for transmitting plural kinds of information. Therefore the efficiency for using the radio channel (frequency) can be improved.

While in case the high speed video data are transmitted, the spread bandwidth is broadened to accommodate a large amount of the transmission information. Therefore the whole assigned frequency band is used with one carrier without being divided. As FIG. 5(c) shows, the transmission superimposing the low-speed data and high-speed data is executed. In this case, data are normally transmitted through the narrow-band spreading. The high-speed data are transmitted through the broad-band spreading switched by a user.

It has been proposed to provide a transmission system for improving the efficiency for using the radio channel (frequency) through frequency division multi-accessing a combination of plural spread bandwidth and the carrier in compliance with the transmission information size. This transmission system requires many filters adapted to the reception frequency and reception bandwidth. Therefore it is difficult for such a system to have down-sizing and circuit integration.

Further the selector for selecting the I/O terminal of plural narrow-band filters is required to have stable frequency characteristic (frequency passing characteristic). The frequency characteristic is likely to be unstable accompanied with broadening of the frequency bandwidth. That is, it becomes difficult to have plural narrow-band filters having required stable frequency characteristics.

It is also difficult to set those narrow-band filters to have the same stable frequency characteristics and yet have the respective center frequencies slightly different with each other. That is, the reception characteristic is likely to vary with the reception carrier frequency.

SUMMARY OF THE INVENTION

It is an object of the present invention to solve the above-described drawbacks of the prior arts by providing a radio reception unit for down-sizing the circuitry and facilitating circuit integration through digitizing as well as keeping the reception characteristic stable irrespective of the reception carrier frequency and reducing power consumption.

The object of the present invention is achieved by a reception unit for receiving a frequency division multi-accessed signal based on not more than n (n is an integer) spread signals derived from spreading a carrier comprising:

conversion means for converting a received signal into a quantizable intermediate frequency band signal;

means for converting the intermediate frequency band signal into a digital signal and outputting a digital intermediate frequency band signal;

n units of frequency conversion means respectively corresponded with n spread signals one by one for frequency converting the digital intermediate frequency band signal so that a center frequency of a corresponding spread signal among the n spread signals becomes 0 Hz;

n units of FIR filter respectively corresponded with the n spread signals one by one for passing only a corresponding spread signal among the frequency converted digital intermediate frequency band signals;

selection means for selecting and outputting signals output from the n units of FIR filters;

control means for controlling frequency conversion conducted by the n units of frequency conversion means and filtering conducted by the n units of FIR filters; and means for inverse-spreading an output signal of the selection means.

Another object of the present invention is achieved by a reception method for receiving a frequency division multi-accessed signal based on not more than n (n is an integer) spread signals derived from spreading a carrier comprising steps of:

converting a received signal into a quantizable intermediate frequency band signal;

converting the intermediate frequency band signal into a digital signal and outputting a digital intermediate frequency band signal;

frequency converting the digital intermediate frequency band signal so that a center frequency of a desired spread signal becomes 0 Hz;

extracting only a spread signal of which center frequency is 0 Hz from the frequency converted digital intermediate frequency band signals; and inverse-spreading the extracted spread signals.

The present invention relates to an art for receiving a signal derived from multiplexing plural spread signals obtained by spreading the carrier. In the present invention, the signal derived from multiplexing plural spread signals is converted into a digital intermediate frequency signal. The digital intermediate frequency signal is then frequency converted so that the center frequency of each spread signal becomes 0 Hz. The spread signal with the center frequency of 0 Hz is only extracted among the frequency converted digital intermediate frequency signals. The extracted spread signal is time-division multiplexed. The resultant time-division multiplexed signal is inverse-spread.

The above operation is controlled based on conversion frequency data and a filter factor according to frequency conversion and reception filter characteristics stored in a factor memory means. In order to broaden the bandwidth for receiving the signal by X times through the control means, the filter factor is read out at every (X−1) factor. The filter factor which has been read out is provided with a transmission gain in compliance with the broadened signal bandwidth so as to keep the increment of the FIR filter constant.

As a result, the present invention requires no plural sampling clock signals conforming to the signal bandwidth nor a demodulation means conforming to the sampling rate. When sampling received signals having different bandwidth with a single clock signal, the signal with narrow spread bandwidth is converted into a signal at a high sampling rate. On the contrary the signal with broad spread bandwidth is converted into a digital signal at a low sampling rate. The resultant received signals have different sampling rates. The FIR filter can be easily provided with decimation filter characteristic for coordinating the reception filter characteristic and the sampling rate.

In case of using "n" FIR filters, the output is selected among those resultant outputs and demodulated through time-division multiplexing (TDMA). Therefore demodulation can be executed by a single demodulation system irrespective of plural carriers.

When using the whole assigned radio frequency band with one carrier, dividing the assigned radio frequency band through frequency division multi-accessing with plural carriers by decreasing the signal bandwidth or using combination thereof, the present invention does not require many reception filters adapted to the required reception frequency or reception bandwidth. Instead the characteristic of the minimum circuit is selected for the operation. The circuit size can be decreased and circuit integration is facilitated through digital signal processing.

The control is uniformly executed based on the conversion frequency data and the filter factor according to the frequency conversion and reception filter characteristics stored in the factor memory means. The obtained outputs tend to have the same characteristics, thus providing stable reception characteristics irrespective of received carrier frequency.

Supposing that, for example, a base station communicates with plural radio reception units (reception terminals) simultaneously, the present invention reduces power consumption through eliminating functions to stop frequency division multi-accessing by suspending operation of unnecessary frequency conversion means or transmission of clock signals to FIR filter when small number of the reception terminals are used and only a few carriers for frequency division multi-accessing are required or no frequency division multi-accessing are executed.

BRIEF DESCRIPTION OF THE DRAWINGS

This and other objects, features and advantages of the present invention will become more apparent upon a reading of the following detailed description and drawings, in which:

FIG. 2A, 2B, and 2C are graphical views for explaining the first embodiment;

DESCRIPTION OF THE PREFERRED EMBODIMENTS

A first embodiment of the present invention is described.

Figure 1:
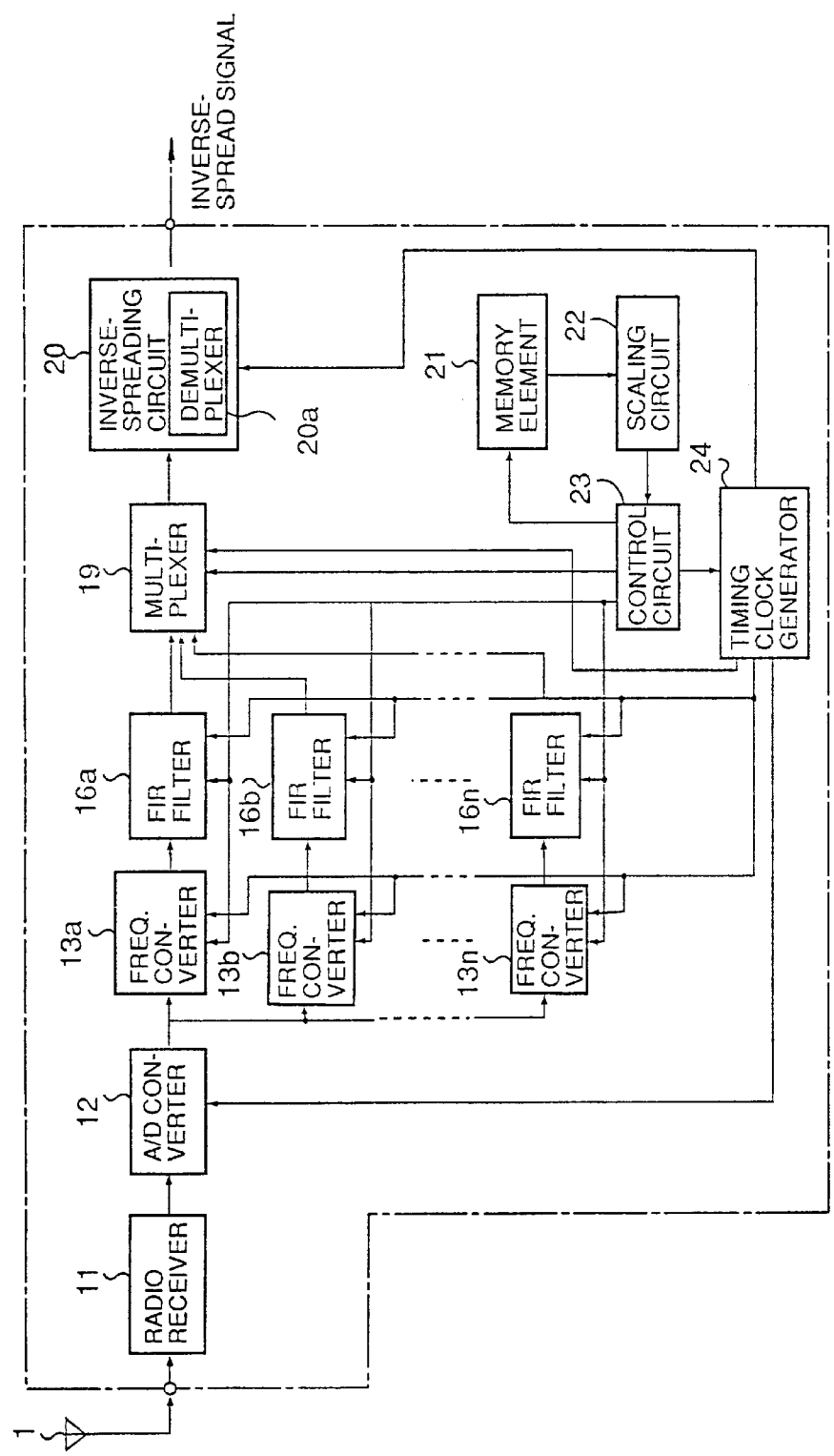
FIG. 1 is a block diagram of a construction of a radio reception unit of a first embodiment according to the present invention.

FIG. 1 is a block diagram of a radio reception unit of the first embodiment according to the present invention.

The radio reception unit of the first embodiment comprises a radio receiver unit 11 for outputting an intermediate frequency signal by converting a received signal from an antenna 1 into a quantizable frequency and an A/D converter 12 for outputting a digital intermediate frequency signal obtained by quantizing the intermediate frequency signal from the radio receiver 11 with a constant sampling clock signal (frequency twice or more wider than the maximum intermediate frequency band).

The radio reception unit of the first embodiment further comprises "n" units of frequency converter 13a to 13n provided at every spread signal if the digital intermediate frequency signal from the A/D converter 12 is formed of maximum "n" (n is an integer) spread signals. Each of the frequency converters 13a to 13n frequency converts the digital intermediate frequency signal so that the center frequency of the desired spread signal becomes 0 Hz. Supposing that the digital intermediate frequency signal is formed of 4 spread signals as shown in FIG. 2A and the frequency converter 13b corresponds with the spread signal S2, the frequency converter 13b frequency converts the digital intermediate frequency signal so that the center frequency of the spread signal S2 becomes 0 Hz. In FIGS. 2A, 2B and 2C, the reference codes SC1, SC2, SC3 and SC4 represent carriers and S1, S2, S3 and S4 represent spread signals derived from spreading the carriers SC1, SC2, SC3 and SC4, respectively.

The radio reception unit of the first embodiment comprises FIR filters 16a to 16n which are respectively connected with the frequency converters 13a to 13n. The FIR filters 16a to 16n filter the frequency converted digital intermediate frequency signals with a filter factor which is set by a control circuit 23 (described later). If the FIR filter 16b corresponds with the spread signal S2 and the frequency converted digital intermediate frequency signal as shown in FIG. 2B is input, the spread signal S2 is only extracted as shown in FIG. 2C.

The radio reception unit of the first embodiment comprises a multiplexer 19 for receiving outputs of the FIR filters 16a to 16n and outputting them selectively in order of the output of the FIR filter 16a first and that of the FIR filter 16b second or the like at a constant time interval and a inverse-spread circuit 20 for inverse-spreading the signal returned to the original signal sequence by matching the signal from the multiplexer 19 to "n" spread signals in a demultiplexer 20a and a memory element 21 for storing conversion frequency data and FIR filter factors.

The radio reception unit of the first embodiment comprises a scaling circuit 22 for outputting a signal derived from multiplying the filter factor stored in the memory element 21 by the scaling factor, a control circuit 23 for controlling each transmission gain of the FIR filters 16a to 16n within any bandwidth (spread signal) to be kept constant and a timing clock generator 24 for providing a clock signal to the frequency converters 13a to 13n, FIR filters 16a to 16n, the multiplexer 19 and inverse-spread circuit 20, respectively.

The operation of the first embodiment is described.

The radio reception unit 11 outputs an intermediate frequency signal by converting a received signal from the antenna 1 into a signal at quantizable frequency.

The A/D converter 12 outputs a digital intermediate frequency signal derived from quantizing the intermediate frequency signal from the radio reception unit 11 with a constant sampling clock signal (frequency twice or more wider than the maximum intermediate frequency band). The digital intermediate frequency signal is input to the frequency converters 13a to 13n simultaneously.

Each of the frequency converters 13a to 13n frequency converts the digital intermediate frequency signal with the frequency conversion data read out from the memory element 21 by the control circuit 23 so that the center frequency of the corresponding spread signal becomes 0 Hz. Then the frequency converted digital intermediate frequency signals are output to the corresponded FIR filter selected among 16a to 16n.

The FIR filters 16a to 16n extract the corresponding spread signal among the digital intermediate frequency signals frequency converted with a predetermined filter factor. That is, the spread signal having the center frequency of 0 Hz is only passed. The predetermined filter factor is read out from the memory element 21 by the control circuit 23 and set in the FIR filters 16a to 16n. Supposing that the filter factor stored in the memory element is for the minimum signal bandwidth, in order to extract the spread signal of the bandwidth for the factor "r" times (r is an integer equal to or more than 2) this factor, each factor is read out at every (r−1) factor, which will be sent to the scaling circuit 22. The scaling circuit 22 multiplies the read out filter factor by the scaling factor r. The resultant signal is sent to the control circuit 23. The control circuit 23 sets the multiplication results as the filter factor for the FIR filters 16a to 16n. Each transmission gain of the FIR filters 16a to 16n is kept constant irrespective of the signal with any bandwidth (spread signal).

In the FIR filters 16a to 16n, one datum per sampling rate d (d is an integer) of the input signal is sent and eliminated by 1/d. The control circuit 23 controls the FIR filters 16a to 16n so that the sampling rate d of each FIR filters 16a to 16n is kept constant.

The multiplexer 19 selects an output of "n" FIR filters 16a to 16n sequentially. Repeating such selection at a constant time interval outputs signals of the FIR filters 16a to 16n to the inverse-spread circuit 20 as the time division multiplexing signals.

The sampling clock input to the A/D converter 12 is generated by the timing clock generator 24. The timing clock generator 24 provides the clock signal adapted to the process timing of the A/D converter 12 to the frequency converters 13a to 13n, FIR filters 16a to 16n, the multiplexer 19 and the inverse-spread circuit 20.

If the number of the carrier is less than n, i.e., the signal is formed of less than n spread signals, the control circuit 23 orders the timing clock generator 24 to stop sending the timing clock signals input to the frequency converters 13a to 13n which are not used for transmission. Similarly as for the FIR filters 16a to 16n other than connected to the frequency converters 13a to 13n in operation, the control circuit 23 orders the timing clock generator 24 to stop sending the timing clock signal to suspend its operation, resulting in decreasing power consumption.

The inverse-spread circuit 20 returns the time division multiplexed base band signal to the original signal sequence corresponding to "n" spread signals in the demultiplexer 20a of the demodulation circuit 20, outputting the inverse-spread signal derived from inverse-spreading the information signal.

Next a second embodiment of the present invention is described.

The second embodiment of the present invention is a radio reception unit as a terminal station communicates with one base station.

Figure 3:
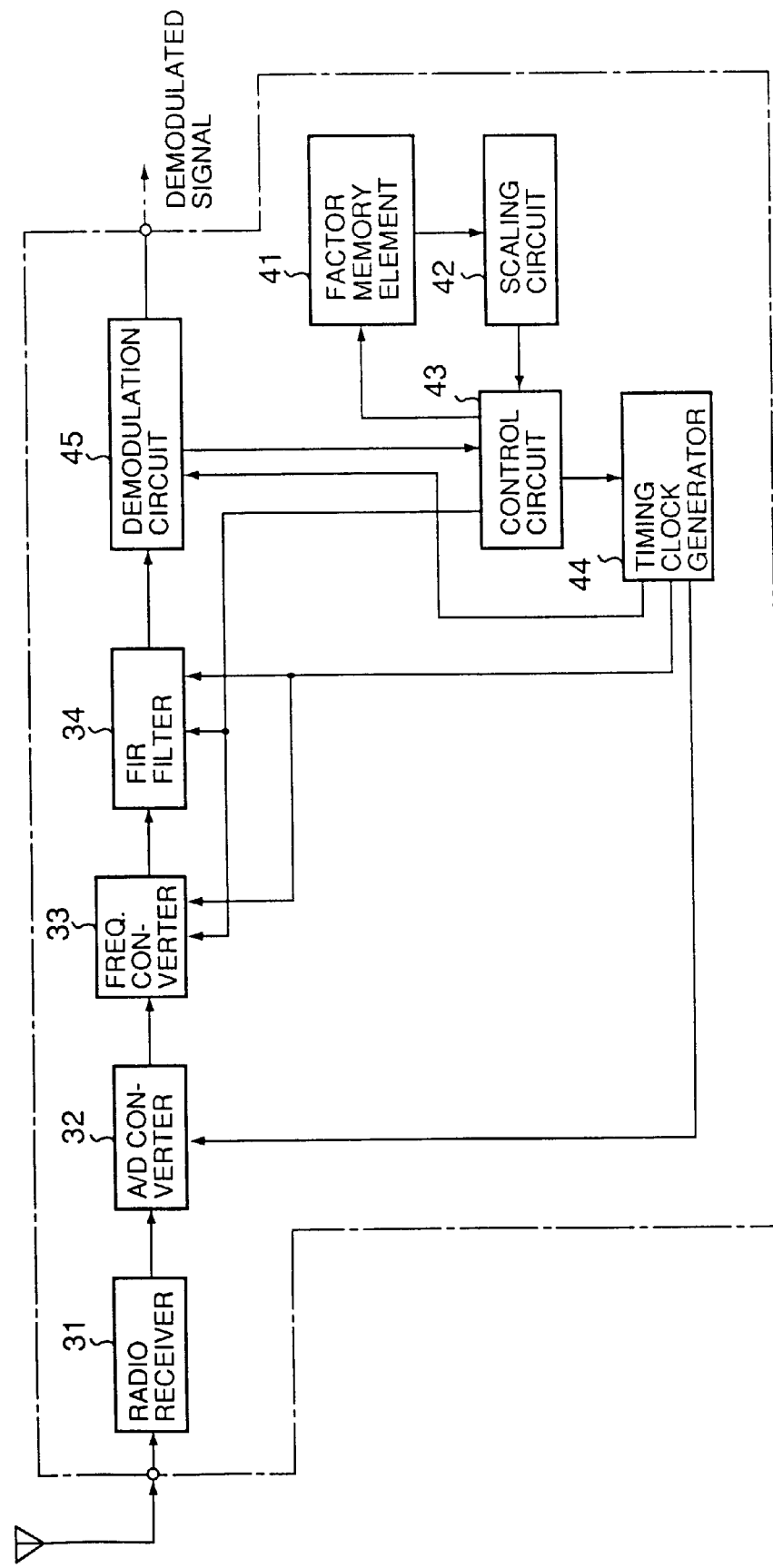
FIG. 3 is a block diagram of a radio reception unit of a second embodiment according to the present invention.
Figure 4:
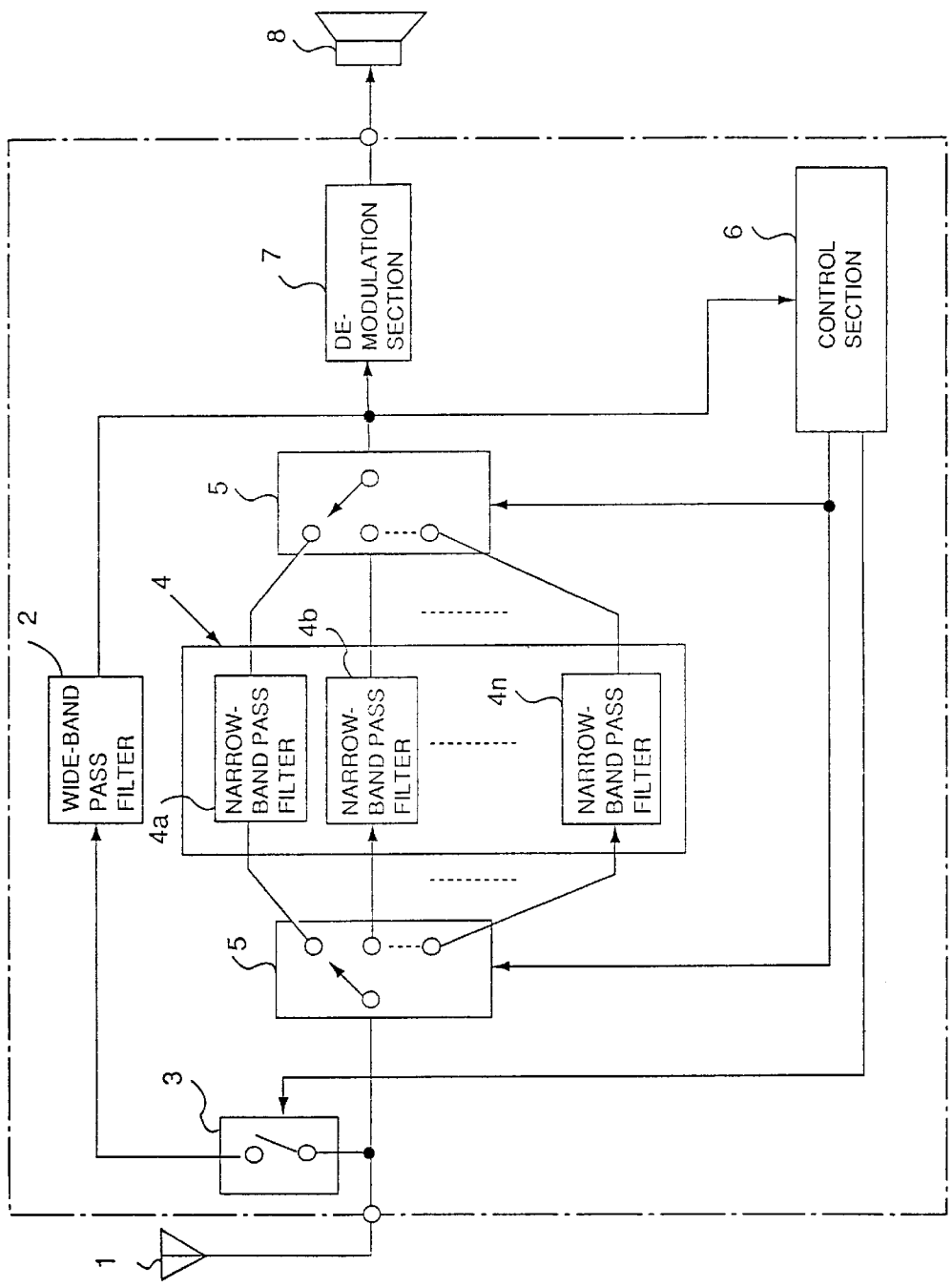
FIG. 4 is a block diagram of a prior art.
Figure 5:
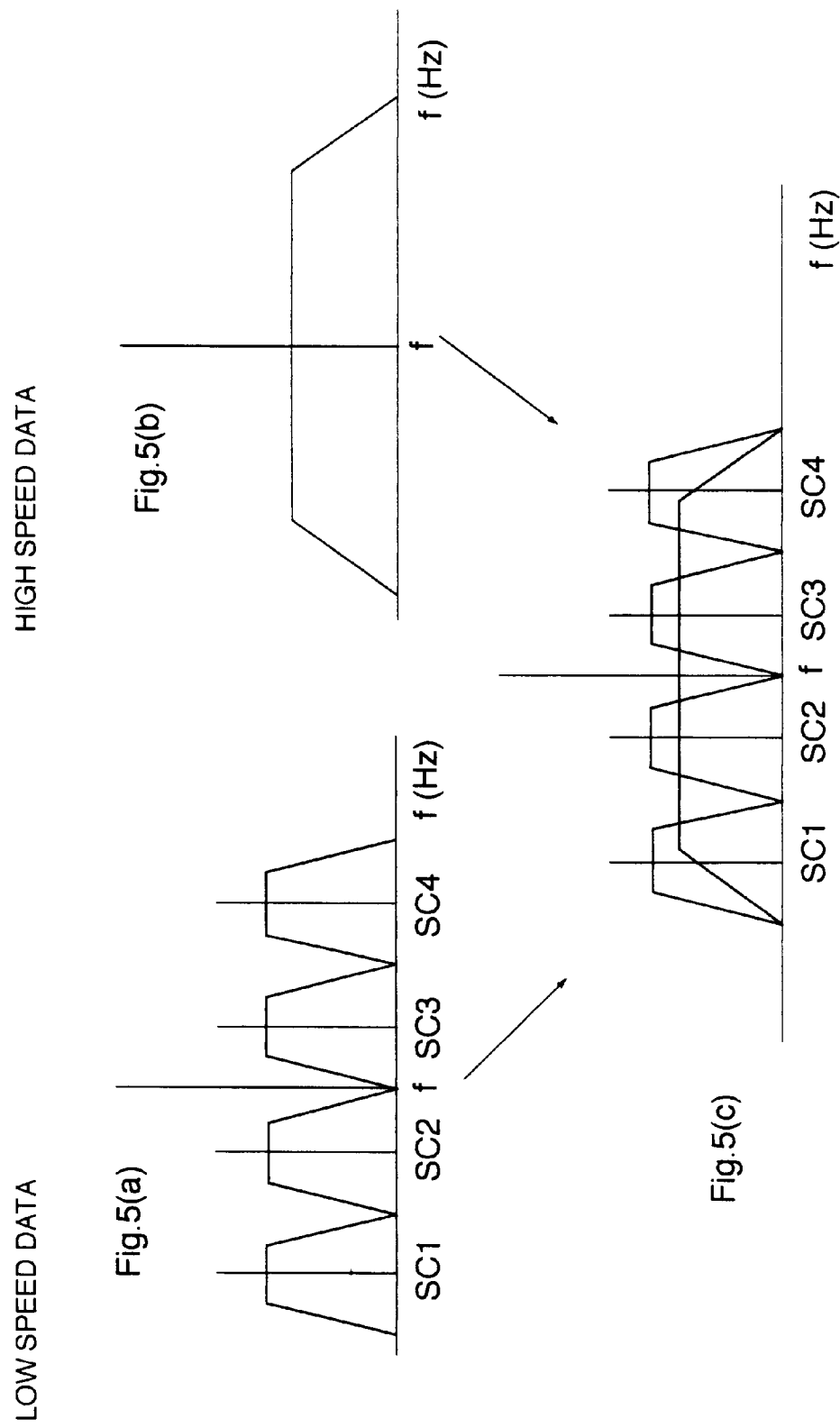
FIGS. 5(*a*), 5(*b*), and 5(*c*) are graphical views explaining transmission of high/low speed data in a spread spectrum communication system.

FIG. 3 is a block diagram of a representative construction of the second embodiment.

Referring to FIG. 3, the radio reception unit of the second embodiment has the same construction as that of the first embodiment shown in FIG. 1 except that one frequency converter 33 and one FIR filter 36 are used and no demultiplexer is provided with a inverse-spread circuit 45. The radio reception unit is provided with a radio reception unit 31, A/D converter 32, memory element 41, scaling circuit 42, control circuit 43 and timing clock generator 44.

An operation of the second embodiment is described.

A received signal from an antenna 1 is converted into a signal at quantizable frequency in a radio reception unit 31. The resultant intermediate frequency signal is output to the A/D converter 32 which outputs the digital intermediate frequency signal derived from quantizing the intermediate frequency signal with a constant sampling clock (frequency twice or more wider than the maximum intermediate frequency bandwidth). The digital intermediate frequency signal is input to the frequency converter 33.

The frequency converter 33 conducts frequency conversion in order to extract the information signal of any carrier so that the desired spread signal among the digital intermediate frequency signals is formed into a band signal with the center frequency of 0 Hz through the conversion frequency data in the memory element 41 read out by the control circuit 43.

The output signal of the frequency converter 33 is input to the FIR filter 36 where the band is limited by the low pass filter formed with the filter factor which is set by the control circuit 43 through reading out from the memory element 41. As a result, only desired spread signal can be extracted.

At an initial reception stage, the control circuit 43 sets conversion frequency data and a filter factor for the frequency converter 33 and the FIR filter 36, respectively so that a combination of the signal bandwidth and the carrier frequency preliminary provided with the radio reception unit is sequentially eliminated.

In the above case, success/failure of reception is judged by detecting the synchronous symbol superimposed in the transmission signal by the inverse-spread circuit 45 connected to the next stage of the FIR filter 36. If such symbol is detected, the reception is determined as success. If it is not detected, the reception is determined as failure. Once the reception succeeds, the control circuit 43 conducts reception with the signal bandwidth and carrier frequency required by the base station. The filter factor stored in the memory element 41 is set for the minimum signal bandwidth.

When receiving a signal with the bandwidth r times the factor (r is an integer equal to or more than 2), the control circuit 43 reads out the factor at every (r−1) factor in the factor memory element 41 and sends the factor to the scaling circuit 42. Each filter factor is multiplied by the scaling factor r for setting the transmission gain for the FIR filter 36, which is kept constant at any bandwidth. The FIR filter 36 sends data at an interval d times the input signal sampling rate (d is an integer) for decreasing the sampling rate by 1/d.

With the number of d, the control circuit 43 orders the FIR filter 36 to keep the sampling rate of the output of the FIR filter 36 constant at any bandwidth. The sampling clock input to the A/D converter 32 is generated by the timing clock generator 44 by which the clock signal in compliance with the process timing of the A/D converter 32 is provided to the frequency converter 33, FIR filter 36 and inverse-spread circuit 45. The inverse-spread circuit 45 inverse-spreads the spread signal.

When using the whole assigned radio frequency band with one carrier, dividing the assigned radio frequency band through frequency division multi-accessing with plural carriers by decreasing the signal bandwidth or using combination thereof, the present invention does not require many reception filters adapted to the required reception frequency or reception bandwidth. Instead the characteristic of the minimum circuit is selected for the operation. The circuit size can be decreased and circuit integration is facilitated through digital signal processing.

The control is uniformly executed based on the conversion frequency data and the filter factor according to the frequency conversion and reception filter characteristics stored in the factor memory means. The obtained outputs tend to have the same characteristics, thus providing stable reception characteristics irrespective of received carrier frequency.

Supposing that, for example, a base station communicates with plural radio reception units (reception terminals) simultaneously, the present invention reduces power consumption through eliminating functions to stop frequency division multi-accessing by suspending operation of unnecessary frequency conversion means or transmission of clock signals to FIR filter when small number of the reception terminals are used and only a few carriers for frequency division multi-accessing are required or no frequency division multi-accessing is executed.

What is claimed is:

1. A reception unit for receiving a frequency division multi-accessed signal based on not more than n, n is an integer, spread signals derived from spreading a carrier comprising:

conversion means for converting a received frequency division multi-accessed signal into a quantizable intermediate frequency band signal;

means for converting said intermediate frequency band signal into a digital signal and outputting a digital intermediate frequency band signal;

n units of frequency conversion means respectively corresponding with n spread signals one by one for frequency converting said digital intermediate frequency band signal so that a center frequency of a corresponding spread signal among said n spread signals becomes zero Hz;

n units of FIR filter respectively corresponding with said n spread signals one by one for passing only a corresponding spread signal among said frequency converted digital intermediate frequency band signals;

selection means for selecting and outputting signals outputted from said n units of FIR filters;

control means for controlling frequency conversion conducted by said n units of frequency conversion means and filtering conducted by said n units of FIR filters; and means for inverse-spreading an output signal of said selection means.

2. The reception unit of claim 1, wherein said FIR filter comprises means for passing only a spread signal whose center frequency is zero Hz among said frequency converted digital intermediate frequency band signals.

3. The reception unit of claim 1, further comprises memory means for storing frequency conversion data used for frequency converting said digital intermediate frequency band signal and a filter factor in compliance with a bandwidth of a spread signal, wherein said control means comprises means for reading out said frequency conversion data and said filter factor stored in said memory means, and controlling said frequency conversion means and filtering operation of said FIR filter based on said read out data.

4. The reception unit of claim 1, wherein said FIR filter comprises means for filtering a signal in compliance with a bandwidth of a corresponding spread signal when said frequency division multi-accessed signal is formed of spread signals having different bandwidth.

5. The reception unit of claim 4 further comprising:

memory means for storing frequency conversion data used for frequency converting said digital intermediate frequency signal and one type of filter factor in compliance with a spread signal having a minimum bandwidth among spread signals having different bandwidth; and scaling means for multiplying a filter factor read out from said memory means by a scaling factor for keeping an increment of said FIR filter constant and outputting an obtained result to said control means;

wherein said control means comprises means for reading out a filter factor at every (X−1) factor, X is an integer equal to or more than 2, stored in said memory means, and outputting a resultant signal to said scaling means in case of processing a spread signal having a bandwidth X times wider than said minimum bandwidth.

6. The reception unit of claim 5, wherein said scaling means comprises means for multiplying a filter factor read out from said memory means by X, X is an integer equal to or more than 2, and outputting the resultant signal in case of processing a spread signal having a bandwidth X times wider than said minimum bandwidth.

7. A reception unit for receiving a frequency division multi-accessed signal based on a plurality of spread signals derived from spreading a carrier comprising:

conversion means for converting a received frequency division multi-accessed signal into a quantizable intermediate frequency band signal;

means for converting said intermediate frequency band signal into a digital signal and outputting a digital intermediate frequency band signal;

frequency conversion means for frequency converting said digital intermediate frequency band signal so that a center frequency of a spread signal to be inverse-spread among a plurality of spread signals becomes zero Hz;

an FIR filter connected to said frequency conversion means for passing only said spread signal to be inverse-spread among said frequency converted digital intermediate frequency band signals;

control means for controlling frequency conversion conducted by said frequency conversion means and filtering conducted by said FIR filter; and means for inverse-spreading an output signal of said FIR filter.

8. The reception unit of claim 7, wherein said FIR filter comprises means for passing only a spread signal of which center frequency is zero Hz among said frequency converted digital intermediate frequency band signals.

9. The reception unit of claim 7, further comprising memory means for storing frequency conversion data used for frequency converting said digital intermediate frequency band signals and a filter factor in compliance with a bandwidth of a spread signal, wherein said control means comprises means for reading out said frequency conversion data and said filter factor from said memory means, and controlling said frequency conversion means and filtering operation of said FIR filter based on said read out data.

10. The reception unit of claim 7, wherein said FIR filter comprises means for filtering a signal in compliance with a bandwidth of a spread signal to be inverse-spread when said frequency division multi-accessed signal is formed of spread signals having different bandwidth.

11. The reception unit of claim 10 further comprising:

memory means for storing frequency conversion data used for frequency converting said digital intermediate frequency band signal and one type of a filter factor in compliance with said spread signal having said minimum bandwidth among said spread signals having different bandwidth; and scaling means for multiplying said filter factor read out from said memory means by a scaling factor for keeping an increment of said FIR filter constant and outputting an resultant signal to said control means, wherein said control means comprises means for reading out filter factors stored in said memory means at every (X−1) factor X is an integer equal to or more than 2, and outputting them to said scaling means in case of processing the spread signal having a bandwidth X times wider than said minimum bandwidth.

12. The reception unit of claim 11, wherein said scaling means comprises means for outputting a signal derived from multiplying said filter factor read out from said memory means by X in case of processing a spread signal having the bandwidth X times X is an integer equal to or more than 2, wider than said minimum bandwidth.

13. A reception unit for receiving a frequency division multi-accessed signal in a spread spectrum modulation system based on not more than n, n is an integer, spread signals derived from spreading a carrier comprising:

conversion means for converting a received frequency division multi-accessed signal into a quantizable intermediate frequency band signal;

an A/D conversion means for converting said intermediate frequency band signal into a digital signal and outputting a digital intermediate frequency band signal;

n units of frequency conversion means corresponded with n spread signals one by one for frequency converting said digital intermediate frequency band signal so that a center frequency of a corresponding spread signal among said n spread signals becomes zero Hz;

n units of FIR filter connected with said n spread signals one by one for passing only a spread signal whose center frequency is zero Hz among said frequency converted digital intermediate frequency band signals;

memory means for storing frequency conversion data used for frequency converting said digital intermediate frequency band signal and one type of a filter factor in compliance with the spread signal having a minimum bandwidth;

scaling means for multiplying said filter factor read out from said memory means by X and sending a resultant signal to said control means in case of processing a spread signal having a bandwidth X times, X is an integer equal to or more than 2, wider than said minimum bandwidth;

control means for reading out said frequency converted data from said memory means and controlling said frequency conversion means based on this read out data, and, when said FIR filter processes a spread signal having a band width X times wider than said minimum bandwidth, for reading out filter factors stored in said memory means at every (X−1) factor, outputting read out factors to said scaling means and controlling filtering operation of said FIR filter based on said filter factors controlled by said scaling means;

selection means for selecting an output signal of said n units of FIR filters at a predetermined interval and outputting a time division multiplexed signal in compliance with a plurality of spread signals of received signals; and means for inverse-spreading an output signal of said selection means.

14. A reception unit for receiving a frequency division multi-accessed signal in a spread spectrum modulation system formed of a plurality of spread signals comprising:

means for converting a received frequency division multi-accessed signal into a quantizable intermediate frequency band signal;

A/D conversion means for converting said intermediate frequency band signal into a digital signal and outputting a digital intermediate frequency band signal;

frequency conversion means for frequency converting said digital intermediate frequency band signal so that a center frequency of a spread signal to be inverse-spread among said plural spread signals becomes zero Hz;

FIR filter connected to said frequency conversion means for passing only a spread signal whose center frequency is 0 Hz among said frequency converted digital intermediate frequency band signals;

memory means for storing frequency conversion data used for frequency converting said digital intermediate frequency band signal and one type of a filter factor in compliance with the spread signal having a minimum bandwidth;

scaling means for multiplying a filter factor read out from said memory means by X and sending a resultant signal to said control means in case of processing a spread signal having a bandwidth X times, X is an integer equal to or more than 2, wider than said minimum bandwidth;

control means for reading out said frequency converted data from said memory means and controlling said frequency conversion means based on this read out data, and, when said FIR filter processes a spread signal having a band width X times wider than said minimum bandwidth, for reading out filter factors stored in said memory means at every, X−1, factor, outputting read out factors to said scaling means and controlling filtering operation of said FIR filter based on said filter factors controlled by said scaling means; and means for inverse-spreading an output signal of said FIR filter.

15. A reception method for receiving a frequency division multi-accessed signal based on not more than n, n is an integer, spread signals derived from spreading a carrier, the method comprising the steps of:

converting a received frequency division multi-accessed signal into a quantizable intermediate frequency band signal;

converting said intermediate frequency band signal into a digital signal and outputting a digital intermediate frequency band signal;

selectively frequency converting said digital intermediate frequency band signal so that a center frequency of a desired spread signal, from among plural spread signals, becomes zero Hz;

determining a filter factor based on data read from a memory element;

selectively extracting only the desired spread signal of which the center frequency is zero Hz from said frequency converted digital intermediate frequency band signal by using said determined filter factor; and inverse-spreading said extracted spread signal.

16. The reception method of claim 15, wherein said frequency conversion step is executed for all spread signals in case of inverse-spreading a plurality of spread signals.

17. The reception method of claim 15, wherein said extraction step for extracting only said desired spread signal is executed for all spread signals, in case of inverse-spreading a plurality of spread signals.

18. A reception method for receiving a frequency division multi-accessed signal based on not more than n, n is an integer, spread signals derived from spreading a carrier, the method comprising the steps of:

converting a received frequency division multi-accessed signal into a quantizable intermediate frequency band signal;

converting said intermediate frequency band signal into a digital signal and outputting a digital intermediate frequency band signal;

selectively frequency converting said digital intermediate frequency band signal so that a center frequency of a desired spread signal, from among plural spread signals, becomes 0 Hz;

selectively extracting only the desired spread signal whose center frequency is zero Hz from said frequency converted digital intermediate frequency band signal; and inverse-spreading said extracted spread signal;

wherein said step for extracting said desired spread signal is applied in case of inverse-spreading a plurality of spread signals having different bandwidth further comprising the steps of:

preliminary storing one type of filter factor in compliance with a spread signal with the minimum bandwidth among spread signals having different bandwidth;

reading out stored filter factors at every (X−1) factor in case of extracting a spread signal of which bandwidth X times, X is an integer equal to or more than 2, wider than said minimum bandwidth; and extracting a desired spread signal by using a filter factor derived from multiplying said read out filter factor by X.

19. A reception unit for receiving a frequency division multi-accessed signal based on not more than n, n is an integer, spread signals derived from spreading a carrier comprising:

a receiver converting a received frequency division multi-accessed signal into a quantizable intermediate frequency band signal;

a converter converting said intermediate frequency band signal into a digital signal and outputting a digital intermediate frequency band signal;

n frequency converters respectively corresponding with n spread signals one by one for frequency converting said digital intermediate frequency band signal so that a center frequency of a corresponding spread signal among said n spread signals becomes zero Hz;

n FIR filters respectively corresponded with n spread signals one by one for passing only a corresponding spread signal among said frequency converted digital intermediate frequency band signals;

a selector selecting and outputting signals outputted from said n units of FIR filters;

a controller controlling frequency conversion conducted by said n frequency converters and filtering conducted by said n FIR filters; and an inverse-spreading circuit inverse-spreading an output signal of said selector.

\* \* \* \* \*